United States Patent
Piccinino, Jr. et al.

(10) Patent No.: US 7,083,339 B2
(45) Date of Patent: Aug. 1, 2006

(54) MAGAZINE SHUTTLE FOR A PHOTOGRAPHIC PROCESSOR

(75) Inventors: Ralph L. Piccinino, Jr., Rush, NY (US); Kevin H. Blakely, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/917,171

(22) Filed: Aug. 12, 2004

(65) Prior Publication Data

US 2006/0034607 A1 Feb. 16, 2006

(51) Int. Cl.
*G03D 3/08* (2006.01)

(52) U.S. Cl. .................. 396/612; 396/599; 355/27; 355/72; 355/75; 101/232; 271/162

(58) Field of Classification Search .............. None
See application file for complete search history.

(56) References Cited

U.S. PATENT DOCUMENTS 5,629,754 A * 5/1997 Nakane et al. ............. 355/72
6,739,770 B1 5/2004 Piccinino, Jr. et al. ...... 396/612

* cited by examiner

*Primary Examiner*—D. Rutledge
(74) *Attorney, Agent, or Firm*—David A. Novais; Kathleen Neuner Manne

(57) ABSTRACT

A photographic processor and method for developing photographic images utilizes a frame and an exposure section that receives and expose print media to record an image on the print media. The exposure section includes a transport system that transports the print media to an exposing mechanism. After the exposing mechanism, the print media goes to a chemical development section contained that develops the exposed print media. A print media supply section secured to a shuttle system attached to the frame wherein the print media supply section provides print media from two or more magazines. The shuttle system sequentially moves one of the magazines to a position in line with the entry to the exposure section and then away from the entry. The shuttle system then moves other magazines from the position in line with the entry to the exposure section and then away from the entry.

17 Claims, 4 Drawing Sheets

MAGAZINE SHUTTLE FOR A PHOTOGRAPHIC PROCESSOR

FIELD OF THE INVENTION

The present embodiments relate to a photographic processor, such as a mini-lab, which includes an exposure section, a processing section, a print media supply section, and a finishing section which can include a drying section.

BACKGROUND OF THE INVENTION

A typical minilab for photographic processing has an entrance for receiving print media, which can be cut sheets or web photographic media. The received print media then follows a processing sequence where the media is transported for printing and development.

For minilabs known in the current art, changing out the magazines of the photographic processor when different types of print media are needed is expensive. A need exists to improve the speed and versatility of these machines, particularly with regard to the feed mechanism of the print media. A need exists for a system and method that can easily, and in a light tight manner, provide different sizes of print media quickly and efficiently in order to increase the versatility of a mini-lab and enable different kinds of print media to be available to a user.

The present invention was designed to meet these needs.

SUMMARY OF THE INVENTION

A photographic processor includes frame and an exposure section contained within the frame. The exposure section receives and exposes print media from a print media supply section to record a latent image on the print media. The exposure section comprises an entry for the print media and a transport system that transports the print media to an exposing mechanism. The exposing mechanism exposes an image on the media. After the exposing mechanism, the transport system moves the print media to a chemical development section. The chemical development section develops images on the exposed media. The print media supply section includes a shuttle system for supporting at least two magazines of print media. The shuttle system is connected to the frame.

Preferably the shuttle system is connected between the frame and the magazines. The shuttle moves sequentially one of the magazines from a first position to an entry position in line with the entry to the exposure section and back again. The shuttle then moves the other magazine from a second position in line with the entry to the exposure section and back again. A controller operates the activity optimally in each section.

Embodied herein is a method of utilizing the embodied photographic processor to process images.

BRIEF DESCRIPTION OF THE DRAWINGS

In the detailed description of the preferred embodiments presented below, reference is made to the accompanying drawings, in which.

Figure 1:
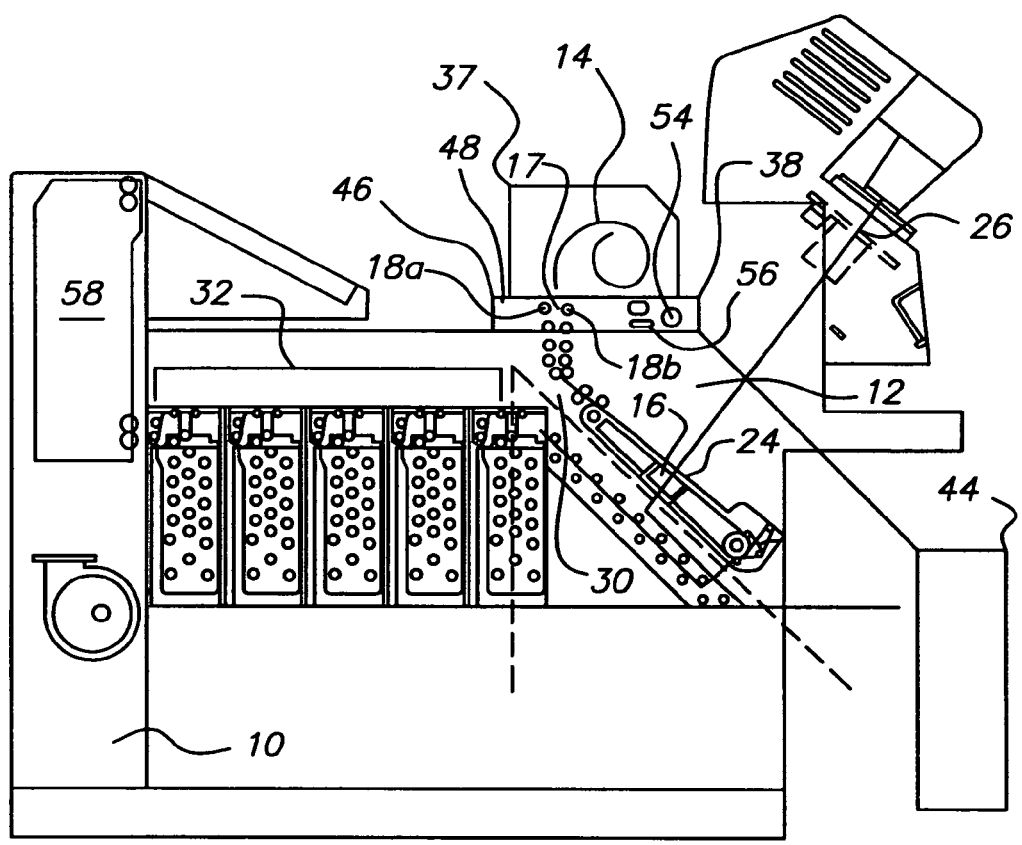
FIG. 1 depicts a side cross-sectional view of an embodiment of a photographic processor.

The present embodiments are detailed below with reference to the listed Figures.

DETAILED DESCRIPTION OF THE INVENTION

Before explaining the present embodiments in detail, it is to be understood that the embodiments are not limited to the particular descriptions and that it can be practiced or carried out in various ways.

The present embodiments relate to a photographic processor with a dual magazine shuttle system which enables print media, such as Duralife™ or paper, or other photographic media from two distinct magazines for storing print media, to insert print media from both magazines in one entry port into the photographic processor.

One of the benefits of the present embodiments is that the overall footprint, or size of the photographic processor, can be made smaller while increasing the versatility of the processor to use different print media sizes. The smaller footprint is particularly useful when the photographic processor needs to be put into a high cost of rent space. The smaller equipment is less expensive to maintain, a significant advantage.

Another advantage of the present embodiments is that a single, common feed mechanism can be used to insert two completely different types of print media into a mini-lab which has a lower cost than currently available dual magazine systems. The single system has a lower cost of manufacture and uses fewer parts than currently available systems.

The present embodiments provide an improved accessibility to magazines for a more continuous operation of the minilab for improved profitability for the use of the lab, with less down time.

The present embodiments automatically move print media contained in two or more print media magazines from one position to a second position. The processor allows the user to process different types of print media automatically. For example, a first print media can produce 5"×7' images while a second print media can produce 8"×10" images in the same processing unit. Similarly, the embodied processors enable print media, such as thin film, to be in a first magazine and paper to be in a second magazine for different types of printed images. Additionally, cut sheets can be placed in a first magazine, and web media can be placed in the second magazine. Both types of print media can then be fed smoothly, in a light tight manner, and automatically into a mini-lab, a self-serve kiosk, thermal printer or other photographic processors.

The photographic processors include a housing or a frame. With the housing or frame, an exposure section receives print media from magazines, and exposes the print media in order to form images on the print media. The frame or housing has an entry that permits print media to be inserted into the housing from the magazines. The first section in the frame or housing is the exposure section that includes a transport system. The transport system leads the print media to an exposing mechanism that can expose an image on the media. The transport system then moves the exposed media to an exit from the exposing section.

From the exposing section in the frame or housing, the exposed print media enters a chemical development section that receives exposed print media from the exit of the exposing section. The chemical development section develops images on the exposed media.

The print media is initially housed in a print media supply section disposed such as above the frame or housing. It is noted that there are other various locations in the machine that would be suitable for housing the shuttle. The print media supply section is located on a shuttle system embodied herein. The print media supply section provides print media from two or more magazines for holding the print media in a light tight manner. Each magazine has an opening to permit the withdrawal of desired print media from the magazine.

A shuttle system is connected to the frame or housing, and is located between the frame or housing and the magazines. The shuttle system supports the print media magazines, and is able to move a first magazine to a position over the entry to the housing or frame of the photographic processor. The shuttle system then sequentially moves a second magazine to a position over the entry to the housing or frame. More than two magazines can be placed on this shuttle system. The length and width of the shuttle system are only limited by the strength of the construction materials and the overall size of the frame or housing of the photographic processor. The shuttle system has a tray on which the magazines are positioned. The shuttle system is secured to a drive shaft and motor combination to move the tray back and forth. In addition, a light tight boot is disposed around the perimeter of the tray to prevent light from reaching the print media from the magazines as the print media travels from the magazines to the exposure section. Additionally, a controller is used to operate the shuttle system based on user input. In addition, the controller optimally controls activity in each section of the photographic processor.

The photographic processor can further include a finishing station adapted to dry and sort the developed print media prior to providing the developed print media to a user.

As described above, in a preferred embodiment, the shuttle system has a slidable magazine support tray disposed on the frame or housing for supporting a quantity of print media magazines. A light tight boot is connected to the frame and surrounds the slidable magazine support tray. A first location device is attached to the frame or housing of the photographic processor on a first side of the slidable magazine support tray. A second location device is attached to the frame or housing of the photographic processor on a second side opposite the first side of the slidable magazine support tray. The first and second locations devices sequentially engage the slidable magazine support tray to orient each magazine opening over the entry in a light tight manner.

The drive shaft is mounted on the frame or housing and is attached to the slidable magazine support tray. The drive shaft slides the magazine support tray from a first position to subsequent positions and orients the magazines over the entry in the housing to the exposure section. The drive shaft motor connects to the drive shaft and is, preferably, mounted on the frame.

In a preferred embodiment, the slidable magazine support tray has two or more tray openings; one opening for each magazine used on the tray. The tray openings correspond to the openings in the magazines. Additional magazine locators can be used if more than two magazines are used on the tray. The magazine locators are sensors connected to the controller to provide signals in order to orientate each magazine opening directly over the entry to the exposure section. The magazine locators can be mechanical stops that prevent the slidable magazine support tray from sliding beyond a predetermined point.

The light tight boot can be made from rubber, natural, synthetic, or combinations thereof, or sturdy, durable, flexible polymer. The dimensions of the boot must be at least the dimensions of the tray and enable the magazine to be positioned over the entry without permitting light to enter the photographic housing.

The photographic processor's exposing section can be an optical exposing mechanism or a digital exposing mechanism. If an optical exposing mechanism is used, typically white light is used with the mechanism. If a digital exposing mechanism is used, typically a liquid crystal display (LCD) and/or a laser is used with the mechanism.

The print media can be in either web form or cut sheet print media. Examples of print media include paper, coated paper, a thin film, or some other photographic substrate.

The photographic processor can be a self-service kiosk.

A method of processing images utilizing the embodied photographic processor entails positioning a first magazine and a second magazine on a slidable magazine support tray located on the frame of a photographic processor, such as a self-service kiosk. After the positioning of the magazines is complete, the slidable magazine support tray is moved to a first position such that an opening in the first magazine is positioned over an entry to an exposing section of the photographic processor. Print media is transferred in a light tight manner from the first magazine to the exposing section in the photographic processor through the entry. Next, the print media is exposed to form an image on the print media that becomes exposed print media. The exposed print media is conveyed to a chemical development section in which the exposed print media is then developed. The developed print media is then dried, such as in a finishing section, and is delivered to the customer or user.

The slidable magazine support tray is then moved to a second position such that an opening in the second magazine is positioned over the entry to the exposing section of the photographic processor. Print media is transferred in a light tight manner from the second magazine to the exposing section through the entry. The print media then exposes an image onto the print media forming exposed print media. The exposed print media is conveyed to a chemical development section that develops the exposed print media. The developed print media is delivered to a finishing section for drying and optional sorting. The finished media is provided to the customer or user.

With reference to the figures, FIG. 1 depicts a side cross-sectional view of a photographic processor 10 with a frame 11. The photographic processor is a minilab. Photographic media or other print media 14 or paper is stored in one or more magazines. FIG. 1 depicts one magazine 37 in this embodiment.

The print media 14 enters the frame 11 at an entry point and is transferred to an exposure section 12 for recording one or more latent images 16 on the print media 14.

The exposure section 12 receives print media. FIG. 1 depicts the print media as web print media.

The exposure section 12 has an entry 17 that receives print media and transports the print media using rollers 18a and 18b to an exposing position 24. The exposing mechanism 26 exposes the print media with white light or light from an LCD.

From the exposure section, the exposed print media goes through the exit 30 and enters a chemical development section 32. In the chemical development section 32, the images are developed on the exposed print media. After being developed, the exposed print media is now developed print media and is passed to a finishing station 58 where the exposed print media can go through a drying operation and/or a sorting operation for sorting of individual images or prints.

As shown in FIG. 1, the supply of print media 14 can be stored in a magazine 37 in a print supply area on top of the frame. FIG. 1 depicts the magazine 37 disposed on the shuttle 38 for automatic movement of the magazines containing print media.

Although two magazines are contemplated for a preferred embodiment, up to three or four magazines can be used with the embodied shuttle for larger photographic processors.

Each magazine has an opening for permitting the withdrawal of print media from the magazine. The openings in the magazines are disposed over openings in the slidable magazine support tray 48 of the shuttle. The shuttle system further includes a light tight boot 46 surrounding a slidable magazine support tray 48. A controller 44 operates the movement of the print media and the exposing, developing, and finishing steps of the process. The controller can be a personal computer or similar device. A motor 54 operates the slidable magazine support tray by driving a drive shaft 56. The slidable magazine support tray is typically supported on the frame 11.

Figure 2:
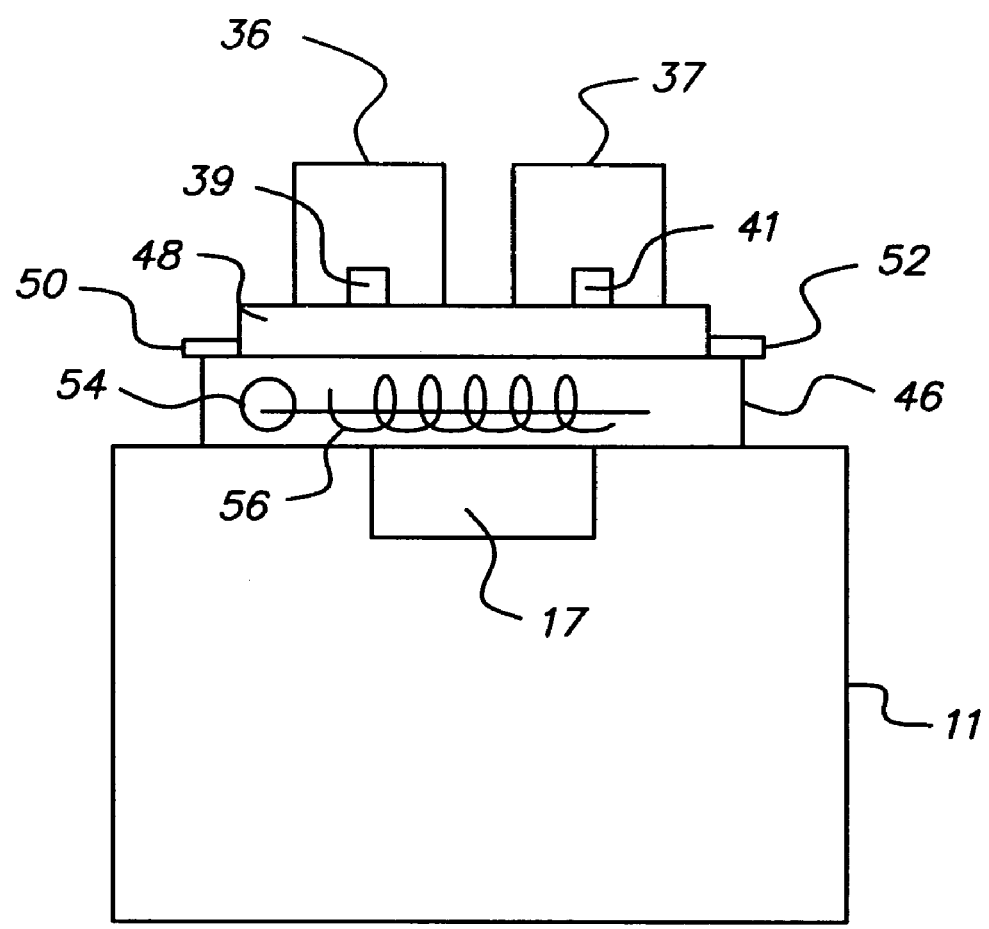
FIG. 2 depicts a front view of an embodiment of a photographic processor.

FIG. 2 is a front view that depicts additional details of the embodied shuttle systems. A slidable magazine support tray 48 holds the print media magazines 36 and 37. Print media magazines 36 and 37 each have respective openings 39 and 41. A first location device 50 and a second location device 52 are positioned on the frame 11 of the photographic processor. These location devices 50 and 52 sequentially engage the slidable magazine support tray 48. The location devices 50 and 52 are adapted to position the slidable magazine support tray 48 so that each magazine opening is located in a light tight manner over the entry 17 of the frame. The location devices 50 and 52 are sensors connected to the controller for precise orientation of the magazine opening over the entry to the exposure section. The location devices 50 and 52 can be simple mechanical stops that provide a size limiting stop to the moving shuttle. A light tight boot 46 is disposed on the frame 11 of the photographic processor and around the slidable magazine support tray 48. The light tight boot 46 is generally rectangular and fits snugly around the tray 48. In a preferred embodiment, the tray 48 has a formed edge that allows the light tight boot 48 to sit in a groove. The grove enables the light tight boot 48 to slide along the groove as the tray 48 moves.

The motor 54 is shown disposed above the frame 11 and connected to a drive shaft 56 for moving the slidable magazine support tray 48. The motor can be a any motor suitable to drive the shuttle. The drive shaft 56 can be a rack and pinion drive shaft or a chain and sprocket drive system.

Figure 3:
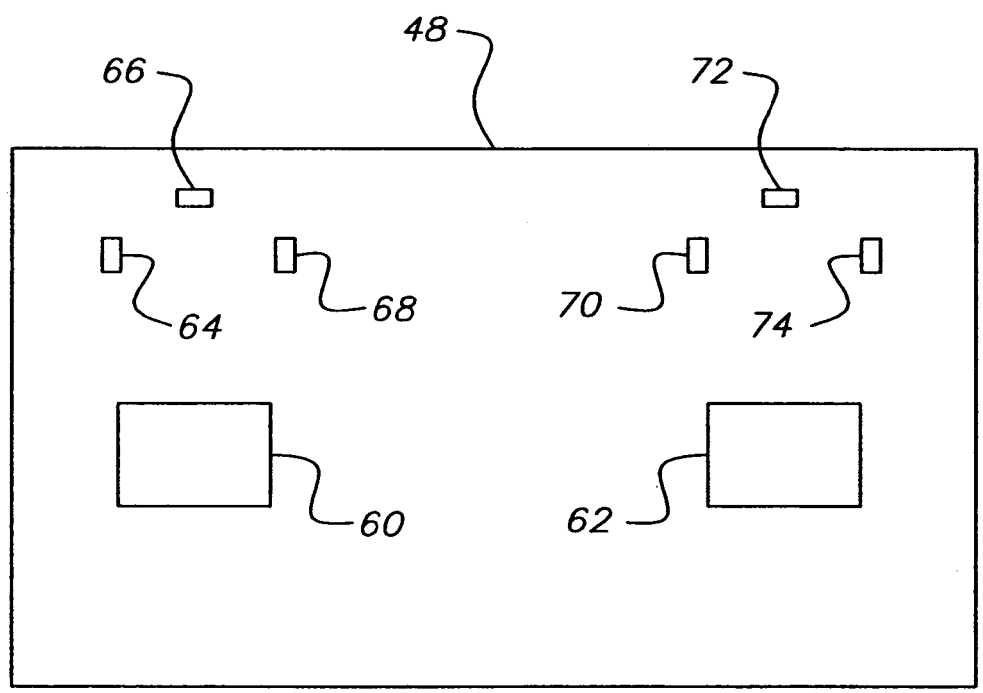
FIG. 3 depicts a top view of an embodiment of a slidable magazine support tray.

FIG. 3 is a top view of the slidable magazine support tray 48. In a preferred embodiment, the tray has two openings 60 and 62. More openings can be used. The tray 48 includes one or more opening per magazine. For the two magazine embodiment shown in FIG. 3, six magazine locators are formed as part of the tray locators 64, 66, 68, 70, 72 and 74. Optionally, if the tray 48 is sheet metal, the magazine locators can be bent tabs used to locate the magazine in the proper position. The bent tabs are welded to the metal or formed from the tray itself.

The tray is typically rectangular and has rectangular openings. The tray can include a length around 12 inches, a width around 26 inches, and a thickness around 5 inches. The tray can be made of materials such as stainless steel, aluminum, and plastics such as polyethylene/polypropylene, molded plastic, and structural foam (Noryll™ from GE of Albany, N.Y.).

Figure 4:
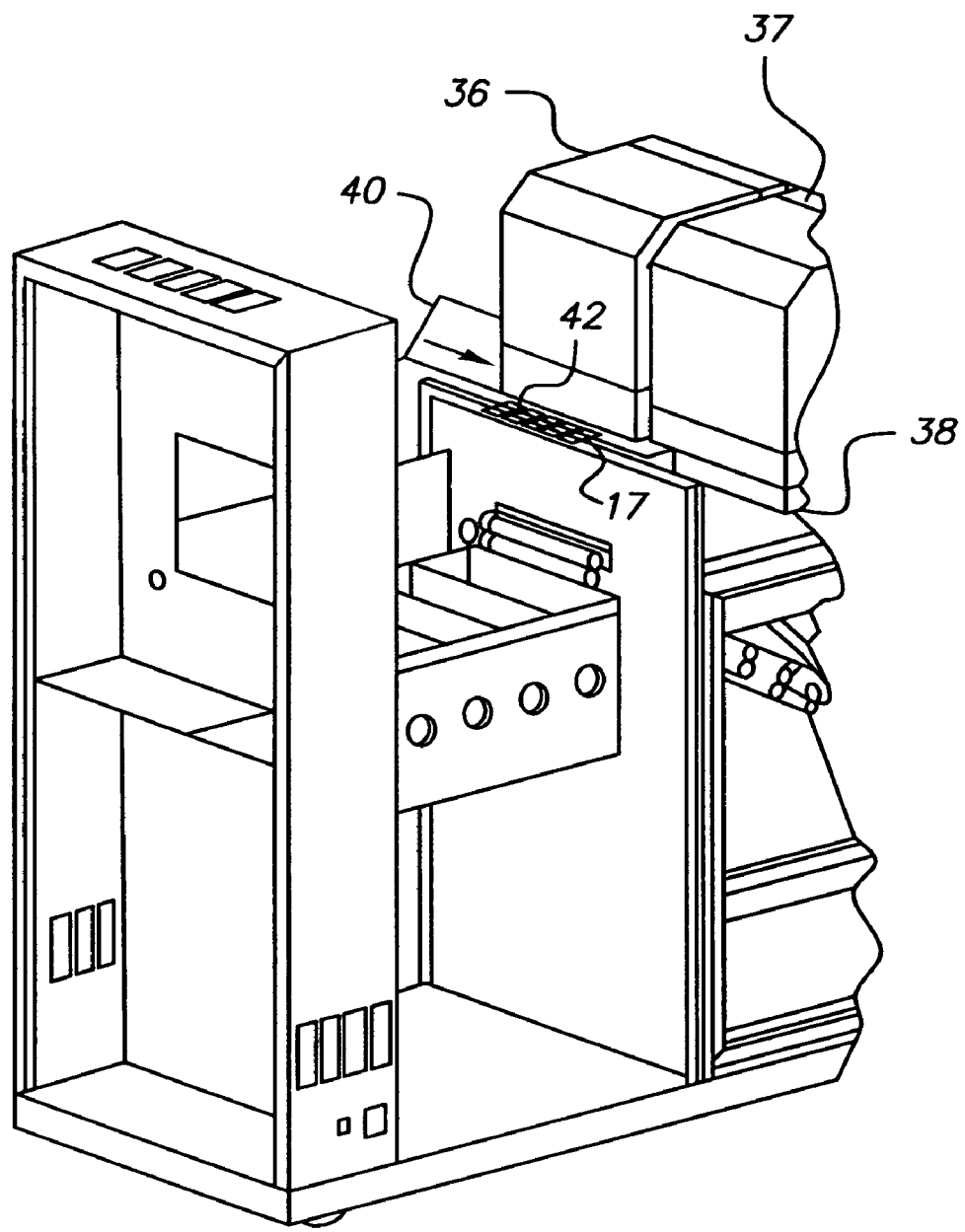
FIG. 4 depicts a perspective view of an embodiment of a photographic processor with a shuttle.

FIG. 4 is a perspective view of the shuttle 38. FIG. 4 depicts the shuttle 38 moving the magazine 36 from a first position 40 to a second position 42 over the entry 17 to the exposure section.

An optical paper processor of the type taught in U.S. Pat. No. 6,739,770 can be used with the embodied devices. Further, the shuttle system can be used with digital paper processors.

In an alternative embodiment, the first magazine drive can align with a drive in the exposure section at the entry in order to ensure that the print media is fed from the magazine to a platen in the exposure section with a high degree of accuracy.

The embodiments have been described in detail with particular reference to certain preferred embodiments thereof, but it will be understood that variations and modifications can be effected within the scope of the embodiments, especially to those skilled in the art.

PARTS LIST 10. photographic processor
11. frame
12. exposure section
14. print media
16. exposing image
17. entry
18a. first roller
18b. second roller
24. exposing position
26. exposing mechanism
30. exit
32. chemical development section
36. first magazine
37. second magazine
38. shuttle
39. opening
40. first position
41. opening
42. second position
44. controller
46. light tight boot
48. slidable magazine support tray
50. first location device
52. second location device
54. motor
56. drive shaft
58. finishing station
60. tray opening
62. tray opening
64. magazine locator
66. magazine locator
68. magazine locator
70. magazine locator
72. magazine locator
74. magazine locator

The invention claimed is:

1. A photographic processor comprising:
   a. a frame;
   b. an exposure section contained within the frame adapted to receive and expose print media to record an image on the print media, wherein the exposure section comprises an entry for print media and a transport system that transports the print media to an exposing mechanism adapted to expose an image on the print media, and an exit for the exposed print media;

c. a chemical development section contained within the frame adapted to receive exposed print media from the exit and developing the exposed print media;

d. a print media supply section secured to a shuttle system and wherein the print media supply section is adapted to provide print media from at least two magazines, wherein each magazine comprises an opening to permit the withdrawal of desired print media, and further wherein the shuttle system is connected to the frame and disposed between the frame and the magazines and is adapted to sequentially move one of the magazines to a position in line with the entry to the exposure section and then away from the entry and then moves the other magazine from the position in line with the entry to the exposure section and then away from the entry; and e. a controller adapted to operate the shuttle system and activity in the chemical development section and exposure section.

2. The photographic processor of claim 1, further comprising a finishing station adapted to dry and sort the developed print media.

3. The photographic processor of claim 1, wherein the shuttle system comprises:

a. a slidable magazine support tray disposed on the frame adapted to support at least the two magazines, wherein the tray comprises tray openings in direct alignment with the openings of the magazines;

b. a light tight boot disposed on the frame, wherein the boot surrounds the slidable magazine support tray;

c. a first location device disposed on the frame on a first side of the slidable magazine support tray;

d. a second location device disposed on the frame on a second side, wherein the second side is opposite of the first side, and wherein the first and second location devices sequentially engage the slidable magazine support tray to orient each magazine opening directly over the entry in a light tight manner;

e. a drive shaft mounted on the frame and attached to the slidable magazine support tray, wherein the drive shaft positions the slidable magazine support tray over the entry; and f. a motor connected to the drive shaft mounted on the frame, wherein the motor moves the drive shaft.

4. The photographic processor of claim 3, wherein the slidable magazine support tray further comprises a plurality of magazine locators, wherein each tray opening corresponds respectively to an opening in the magazine, and wherein each set of magazine locators corresponds to at least one magazine.

5. The photographic processor of claim 3, wherein the light tight boot is composed of a rubber or a sturdy, durable, flexible polymer.

6. The photographic processor of claim 3, wherein the light tight boot dimensions are at least the dimensions of the entry.

7. The photographic processor of claim 3, wherein the location devices comprise sensors connected to the controller, wherein the location devices provide signals that permit orientation of the magazine opening directly over the entry to the exposure section.

8. The photographic processor of claim 3, wherein the location devices comprise mechanical stops adapted to prevent the slidable magazine support tray from sliding beyond a predetermined point.

9. The photographic processor of claim 1, wherein the exposing section comprises an optical exposing mechanism or a digital exposing mechanism.

10. The photographic processor of claim 9, wherein the optical exposing mechanism comprises white light.

11. The photographic processor of claim 9, wherein the digital exposing mechanism comprises a liquid crystal display (LCD) or a laser.

12. The photographic processor of claim 1, wherein the print media is web form print media or cut sheet print media.

13. The photographic processor of claim 1, wherein the print media is paper or a thin film.

14. The photographic processor of claim 1, wherein the photographic processor is a self-service kiosk.

15. A method of processing images comprising the steps of:

a. positioning a first magazine with a first magazine opening and a second magazine with a second magazine opening, wherein the magazines comprise print media, and wherein the openings are positioned in line with tray openings disposed in a slidable magazine support tray;

b. disposing the slidable magazine support tray in a photographic processor;

c. moving the slidable magazine support tray to a first position such that the first magazine opening is positioned over an entry to an exposing section of the photographic processor;

d. transferring print media in a light tight manner from the first magazine to the exposing section through the entry;

e. exposing print media to form an image on print media forming exposed print media;

f. conveying the exposed print media to a chemical development section;

g. developing the exposed print media;

h. finishing the exposed print media forming finished exposed print media;

i. delivering the finished exposed print media to a user;

j. moving the slidable magazine support tray to a second position such that the second magazine opening is positioned over the entry to the exposing section of the photographic processor;

k. transferring print media in the light tight manner from the second magazine to the exposing section through the entry;

l. exposing the print media to form a second image on the print media forming second exposed print media;

m. conveying the second exposed print media to a chemical development section;

n. developing the second exposed print media;

o. finishing the second exposed print media forming second finished exposed print media; and p. delivering the second finished exposed print media to the user.

16. The method of claim 15, further comprising the step of using print media in the first magazine that is different from print media in the second magazine.

17. The method of claim 15, wherein the photographic processor is a self-service kiosk.

* * * * *